(12) United States Patent
Shibuya et al.

(10) Patent No.: US 7,752,460 B2
(45) Date of Patent: Jul. 6, 2010

(54) GENERAL-PURPOSE COMPUTER AND COPYRIGHT MANAGEMENT METHOD FOR USE THEREIN

(75) Inventors: Noboru Shibuya, Tokyo (JP); Kenichi Agata, Tokyo (JP); Akihiro Miyano, Tokyo (JP)

(73) Assignee: Sony Corporation, Tokyo (JP)

( * ) Notice: Subject to any disclaimer, the term of this patent is extended or adjusted under 35 U.S.C. 154(b) by 1292 days.

(21) Appl. No.: 09/754,519

(22) Filed: Jan. 4, 2001

(65) Prior Publication Data

US 2001/0021976 A1 Sep. 13, 2001

(30) Foreign Application Priority Data

Jan. 5, 2000 (JP) ............................... 2000-000309

(51) Int. Cl.
G06F 21/24 (2006.01)
G06F 12/14 (2006.01)
G06F 1/32 (2006.01)
G06F 7/04 (2006.01)
G06F 21/02 (2006.01)

(52) U.S. Cl. .................... 713/193; 713/324; 726/26; 726/27; 726/28; 726/29; 726/30; 705/57

(58) Field of Classification Search .............. 713/200, 713/193, 324; 705/57; 726/26–30
See application file for complete search history.

(56) References Cited

U.S. PATENT DOCUMENTS

| | | | |
|---|---|---|---|
| 5,199,066 A | 3/1993 | Logan | |
| 5,230,074 A * | 7/1993 | Canova et al. | 714/14 |
| 5,267,123 A * | 11/1993 | Boothroyd et al. | 361/679.09 |
| 5,432,947 A * | 7/1995 | Doi | 713/320 |
| 5,850,560 A * | 12/1998 | Kang | 713/324 |
| 5,930,110 A * | 7/1999 | Nishigaki et al. | 361/686 |
| 5,974,141 A * | 10/1999 | Saito | 705/52 |
| 6,038,672 A * | 3/2000 | Klein | 713/322 |
| 6,047,103 A * | 4/2000 | Yamauchi et al. | 386/94 |
| 6,097,814 A * | 8/2000 | Mochizuki | 380/44 |
| 6,226,237 B1 * | 5/2001 | Chan et al. | 710/14 |
| 6,266,714 B1 * | 7/2001 | Jacobs et al. | 710/14 |
| 6,349,386 B1 * | 2/2002 | Chan | 713/323 |
| 6,351,442 B1 * | 2/2002 | Tagawa et al. | 369/53.41 |

(Continued)

FOREIGN PATENT DOCUMENTS

DE 43 39 438 10/1995

(Continued)

OTHER PUBLICATIONS

Schneier, Bruce "Applied Cryptography: Second Edition", John Wiley and Sons, Inc. 1996, pp. 223-225.*

*Primary Examiner*—Matthew T Henning
(74) *Attorney, Agent, or Firm*—Oblon, Spivak, McClelland, Maier & Neustadt, L.L.P.

(57) ABSTRACT

A general-purpose computer cross-authenticates an external storage medium which is detachably loaded in the general-purpose computer, directly storing copyrighted data from its internal storage means into the loaded external storage medium. An HDD, an internal storage means of the general-purpose computer, holds such data protected by copyright as music data. A memory card driver directly cross-authenticates a memory card, which is an external storage medium, and, upon successful cross-authentication, controls the memory card so that it stores the data from the HDD.

13 Claims, 12 Drawing Sheets

U.S. PATENT DOCUMENTS

| | | | |
|---|---|---|---|
| 6,367,019 B1 * | 4/2002 | Ansell et al. | 726/26 |
| 6,452,885 B1 * | 9/2002 | Yeo | 369/53.21 |
| 6,615,192 B1 * | 9/2003 | Tagawa et al. | 705/57 |
| 6,686,900 B1 * | 2/2004 | Levy et al. | 345/156 |
| 6,697,944 B1 * | 2/2004 | Jones et al. | 713/168 |
| 6,859,535 B1 * | 2/2005 | Tatebayashi et al. | 380/201 |
| 7,243,168 B2 * | 7/2007 | Chan et al. | 710/14 |
| 7,272,723 B1 * | 9/2007 | Abbott et al. | 713/185 |
| 7,548,887 B1 * | 6/2009 | Ogino et al. | 705/57 |

FOREIGN PATENT DOCUMENTS

| | | |
|---|---|---|
| EP | 0 733 490 | 5/1997 |
| EP | 0773490 A1 * | 5/1997 |
| EP | 0 919 929 | 6/1999 |
| EP | 0 923 076 | 6/1999 |
| EP | 1265126 * | 11/2002 |

* cited by examiner

GENERAL-PURPOSE COMPUTER AND COPYRIGHT MANAGEMENT METHOD FOR USE THEREIN

BACKGROUND OF THE INVENTION

The present invention relates generally to a general-purpose computer and a copyright management method for use therein and, more particularly, to a general-purpose computer for storing data into a cross-authenticated external storage medium and to a copyright management method for use therein.

For music data compression and coding technologies, ATRAC (trademark) and MPEG (Moving Picture Experts Group) audio layer 3 (hereafter referred to as MP3) have come to a wide use on personal computers (or general-purpose computers) and other computer systems.

Personal computers can directly reproduce the music data compressed by these compression technologies and store these music data into portable storage devices such as the Memory Stick Walkman (trademark) connected to personal computers.

Users who stored desired music data into a portable device can disconnect it from the personal computer and carry it about to reproduce the music data at any desired places.

Some portable devices are adapted to detachably accommodate a memory card such as the Memory Stick (trademark) for storing music data. Further, some portable devices and some memory cards can cross-authenticate each other and permit the movement of music data only when cross-authentication is established, thereby preventing the unauthorized use of music data from taking place.

However, storing music data into a memory card which cross-authenticates with a portable device must load this memory card into this portable device connected to a personal computer before storing music data, thereby requiring cumbersome operations.

SUMMARY OF THE INVENTION

It is therefore an object of the present invention to provide a general-purpose computer and a copyright management method that allow storage of copyrighted data into an external storage medium such as a memory card detachably loaded in the general-purpose computer upon cross-authentication between the general-purpose computer and the external storage medium, thereby realizing the portability of vast quantities of music data while preventing them from unauthorized use.

In carrying out the invention and according to one aspect thereof, there is provided a general-purpose computer having a central processing unit for executing predetermined processing as instructed by a program stored in an internal storage means in this general-purpose computer, comprising: a loading means, which is integrally arranged on a case of the general-purpose computer, for detachably accommodating an external storage medium for storing copyrighted data; a cross-authentication means for cross-authenticating the general-purpose computer with the external storage medium through the loading means; and a control means for making the external storage medium store the copyrighted data stored in the internal storage means when the general-purpose computer has been successfully cross-authenticated with the external storage medium by the cross-authentication means.

The above-mentioned general-purpose computer further comprises a reproduction means for reproducing data read from the external storage medium; wherein the control means, when the general-purpose computer has been cross-authenticated with the external storage medium, reads the copyrighted data from the external storage medium and supplies the copyrighted data to the reproduction means.

The above-mentioned general-purpose computer further comprises: a power supply means for supplying an electric power to the cross-authentication means, the control means, and the reproduction means independently of the central processing unit; wherein, in an inactive state in which no electric power is supplied to the central processing unit, the control means reads the copyrighted data from the external storage medium when the general-purpose computer has been cross-authenticated with the external storage medium to supply the copyrighted data to the reproduction means.

In carrying out the invention and according to another aspect thereof, there is provided a copyright management method for use in a general-purpose computer, comprising the steps of: cross-authentication processing for executing cross-authentication between the general-purpose computer and an external storage medium storing copyrighted data through a loading means integrally arranged on a case of the general-purpose computer, in the loading means of which the external storage medium is detachably loaded; and control processing for storing the copyrighted data from the internal storage means into the external storage medium upon successful cross-authentication between the general-purpose computer and the external storage medium in the cross-authentication processing step.

In the above-mentioned general-purpose computer and the above-mentioned copyright management method for use in this general-purpose computer, the general-purpose computer is directly cross-authenticated with the external storage medium and, upon successful cross-authentication, the copyrighted data are stored from the internal storage means of the general-purpose computer into the external storage medium.

The above and other objects, features and advantages of the present invention will become apparent from the following description and the appended claims, taken in conjunction with the accompanying drawings in which like parts or elements denoted by like reference symbols.

BRIEF DESCRIPTION OF THE DRAWINGS

These and other objects of the invention will be seen by reference to the description, taken in connection with the accompanying drawing, in which.

DETAILED DESCRIPTION OF PREFERRED EMBODIMENTS

This invention will be described in further detail by way of a general-purpose computer practiced as one preferred embodiment of the invention with reference to the accompanying drawings.

Figure 1:
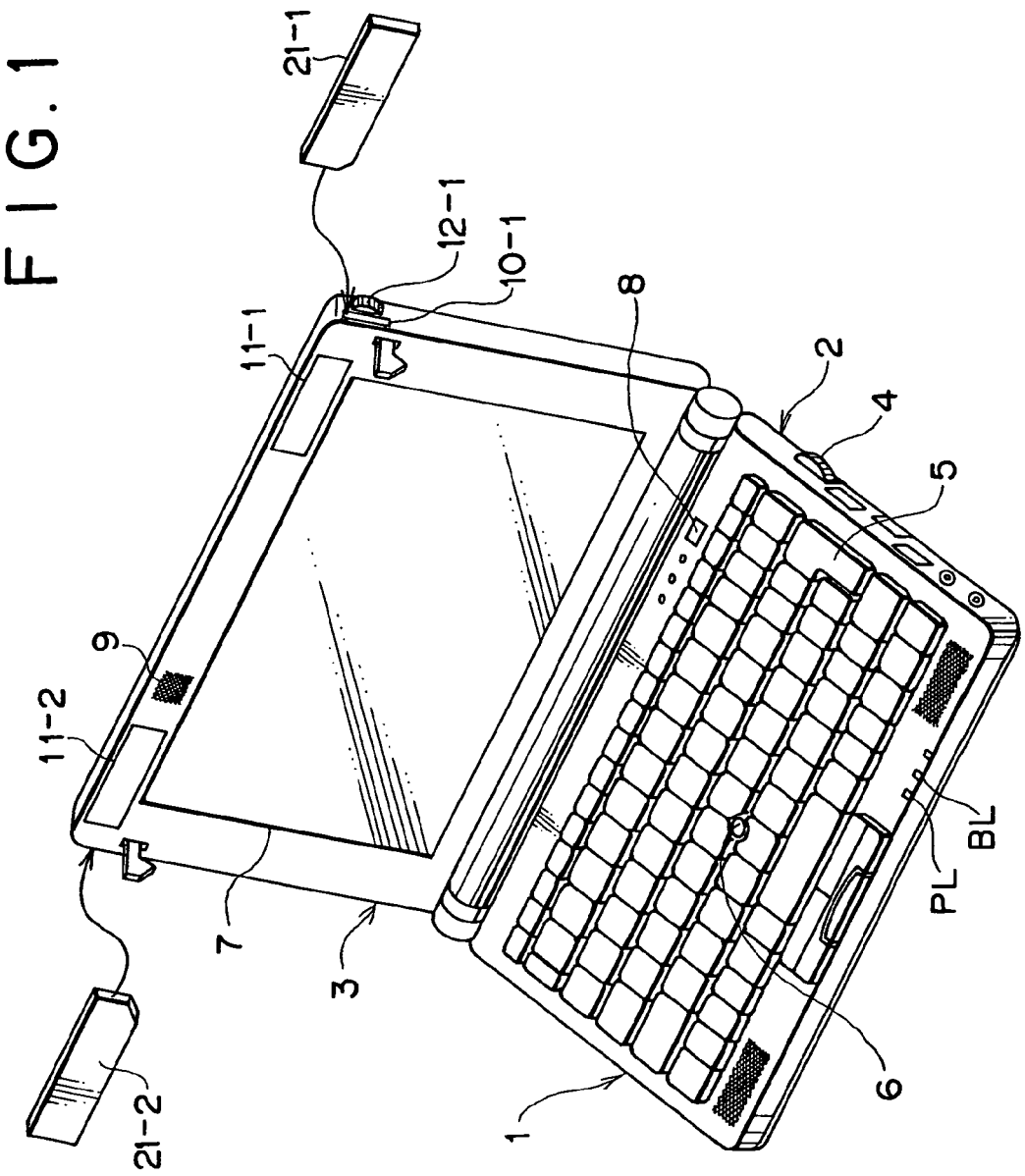
FIG. 1 is an external perspective view illustrating a personal computer 1.
Figure 2:
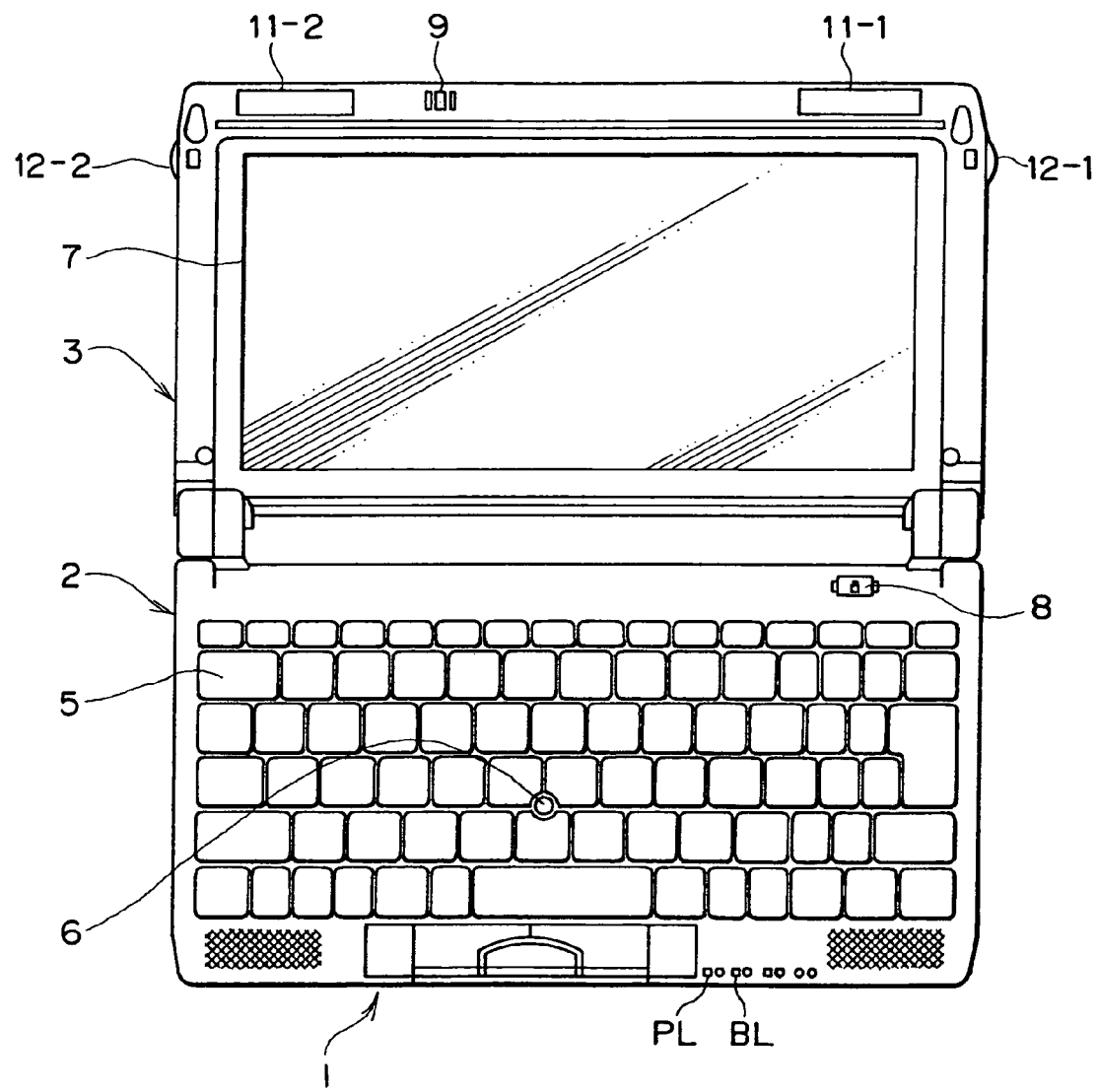
FIG. 2 is a top view of the personal computer 1.
Figure 3:
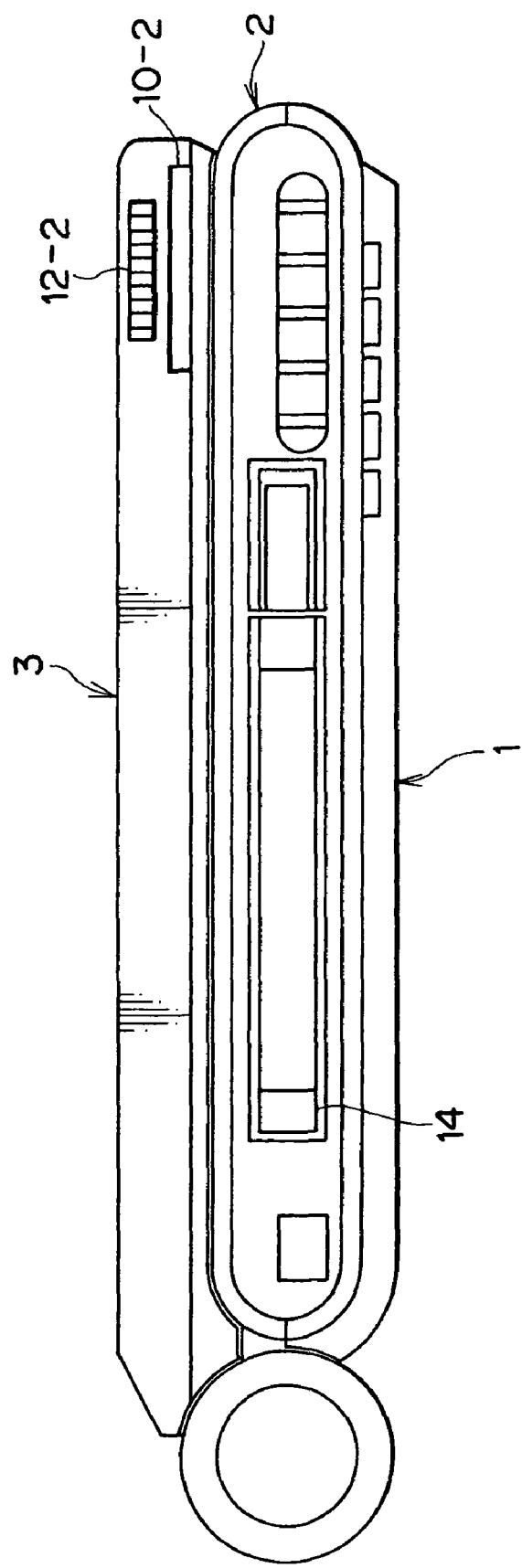
FIG. 3 is a left side view of the personal computer 1.
Figure 4:
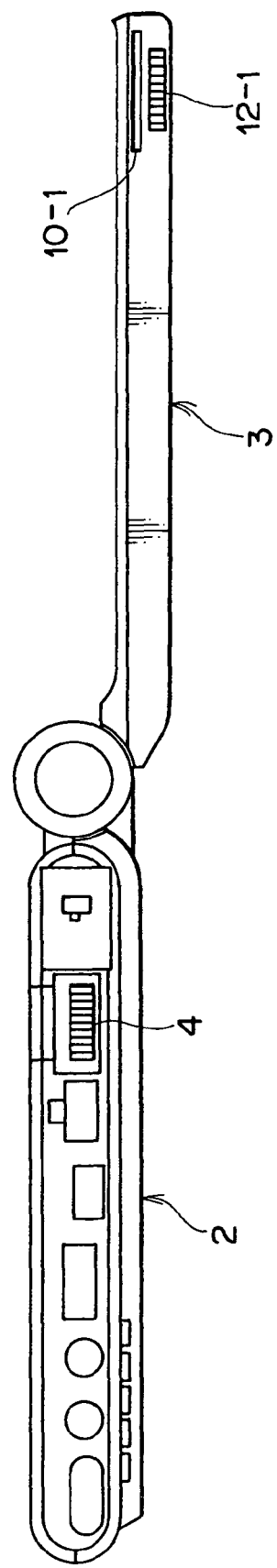
FIG. 4 is a right side view of the personal computer 1.
Figure 5:
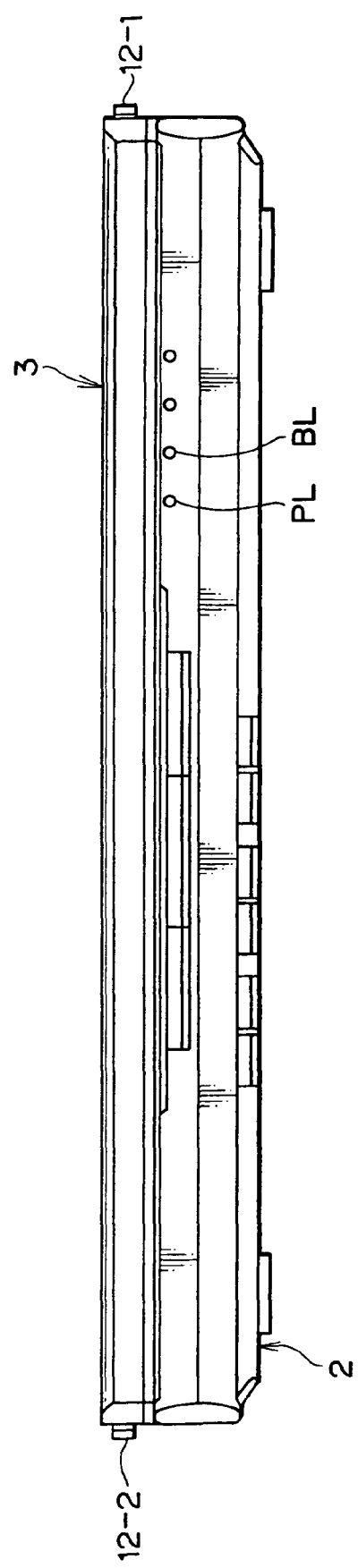
FIG. 5 is a front view of the personal computer 1.
Figure 6:
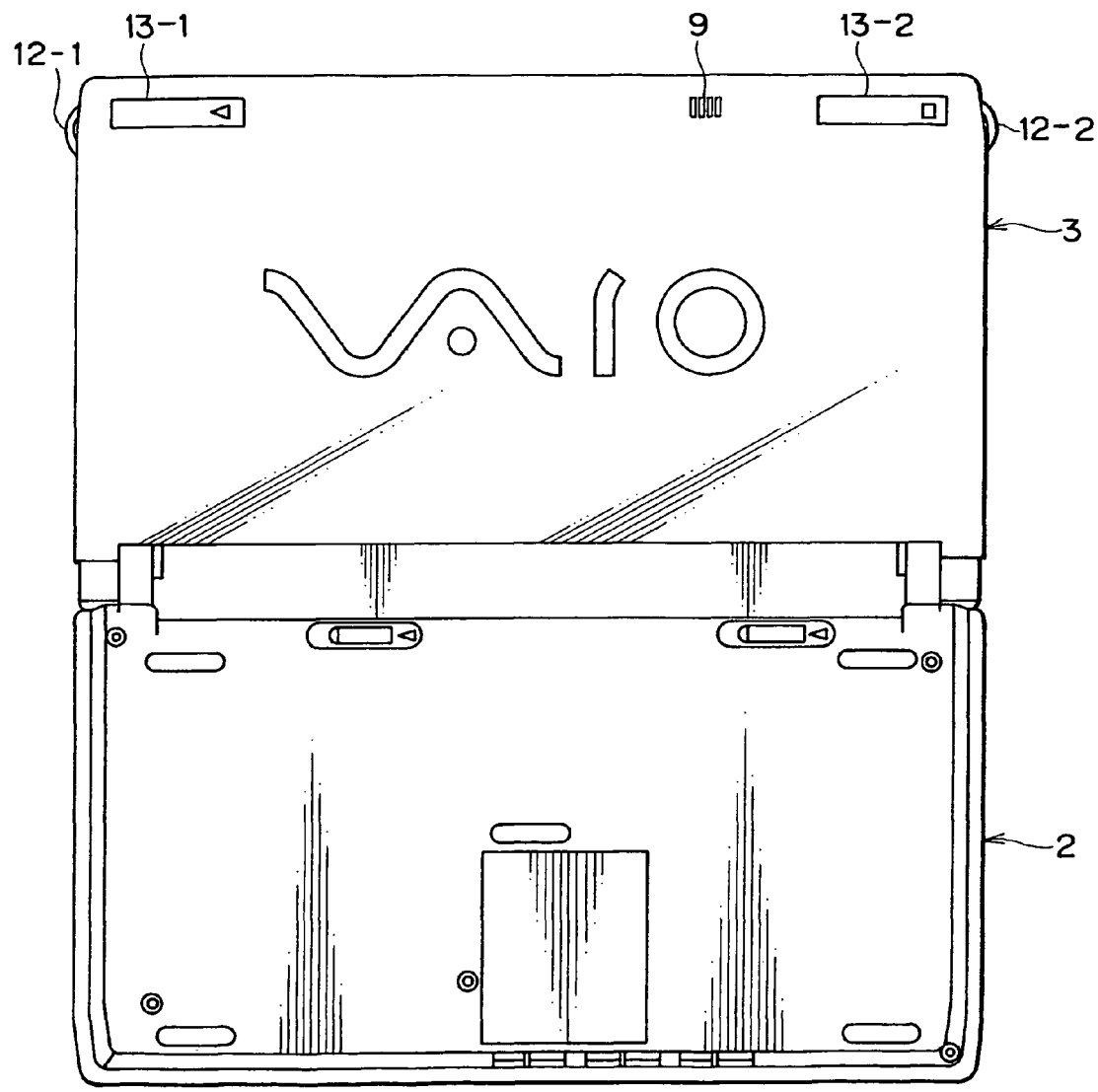
FIG. 6 is a bottom view of the personal computer 1.

Now, referring to FIGS. 1 through 6, there are shown exemplary configurations of a portable personal computer according to the present invention. In the figure, a personal computer 1, a mini-note type personal computer, is basically composed of a main body 2 and a display section 3 which is pivotally mounted on the main body. FIG. 1 is an external perspective view illustrating the personal computer 1 with the display section 3 open relative to the main body 2. FIG. 2 is a top view of the personal computer 1 in the state shown in FIG. 1. FIG. 3 is a left side view illustrating the personal computer 1 with the display section 3 closed relative to the main body 2. FIG. 4 is a right side view illustrating the personal computer 1 with the display section 3 open relative to the main body 2 by 180 degrees. FIG. 5 is a front view of the personal computer 1 in the state shown in FIG. 3. FIG. 6 is a bottom view illustrating the personal computer 1 in the state shown in FIG. 4.

The main body 2 is arranged on with top surface thereof with a keyboard 5 which is operated when inputting letters and symbols, a stick-type pointing device 6 which is operated to move a mouse cursor, and a power switch which is operated to turn on/off the power to the personal computer 1.

A jog dial 4 is disposed on one side of the main body 2 along with various connectors. When the jog dial 4 is rotated, the personal computer 1 accordingly executes predetermined processing (for example, screen scroll); when the jog dial 4 is pressed in the direction of the main body 2, the personal computer 2 accordingly executes predetermined processing (for example, entering icon selection).

As shown in FIG. 3, the left side of the main body 2 is provided with a slot 13 for accommodating a card (a PC card) compliant with the PCMCIA (Personal Computer Memory Card International Association) standard.

On the front side of the display section 3, an LCD (Liquid Crystal Display) 7 for displaying images is arranged. An upper right section of the display section 3 as shown in FIG. 1 is arranged with a memory card slot 10-1 for detachably accommodating a memory card 21-1 as an external storage medium, an opening 11-1 permitting the user to check the loaded memory card 21-1, and a jog lever 12-1 for starting the reproduction of music data stored in the memory card 21-1. The jog lever 12-1 is projecting from the display section 3 to facilitate, for example, operations such as pushing up and down and pressing in the direction of the display section 3 with the same opened relative to the main body 2. The jog lever 12-1 is also arranged so as to be operated with the display section 3 closed relative to the main body 2.

Referring to FIG. 6, an upper left section of the display section 3 opposite to the LCD 7 (the rear side being the side which can be seen from the user when the display section 3 is closed relative to the main body 2) is arranged with an LCD 13-1 for displaying, for example, a state of the reproduction of music data stored in the memory card 21-1.

An upper left section of the display section 3 as shown in FIG. 1 is arranged with a memory card slot 10-2 for accommodating a memory card 21-2 as the external storage medium, an opening 11-2 for permitting the user to check the loaded memory card 21-2, and a jog lever 12-2 for starting the reproduction of music data stored in the memory card 21-2. The jog lever 12-2 is projecting from the display section 3 to facilitate, for example, operations such as pushing up and down and pressing in the direction of the display section 3 with the same opened relative to the main body 2. The jog lever 12-2 is also arranged so as to be operated with the display section 3 closed relative to the main body 2.

As shown in FIG. 6, an upper left section of the display section 3 opposite to the LCD 7 (the rear side being the side which can be seen from the user when the display section 3 is closed relative to the main body 2) is arranged with an LCD 13-2 for displaying, for example, a state of the reproduction of music data stored in the memory card 21-2.

The personal computer 1 stores music data (hereafter also referred to as content) stored in the personal computer 1 into the memory card 21-1 or 21-2 loaded therein, reads music data from the loaded memory card 21-1 or 21-2, executes processing such as decoding on the read music data, and outputs a tone corresponding to the processed music data.

At an upper portion of the display section 3, a microphone 9 is arranged. The microphone 9 can also pick up sound from the rear side as shown in FIG. 6.

The front side of the main body 2 is arranged with a power light PL, a battery light BL, and other LED lights.

Figure 7:
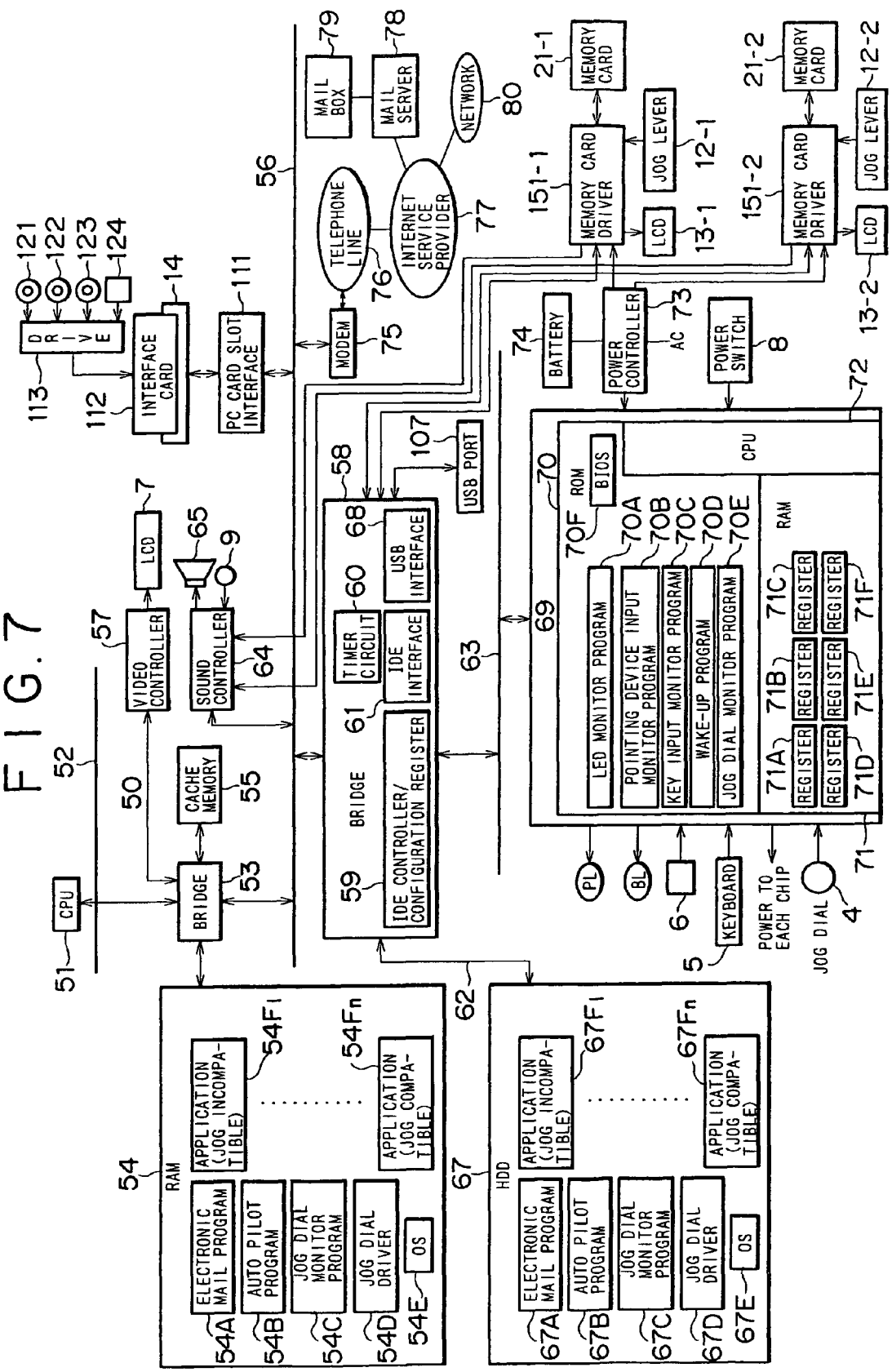
FIG. 7 is block diagram illustrating a configuration of the personal computer 1 practiced as one embodiment of the invention.

The following describes a configuration of the personal computer 1 practiced as one preferred embodiment of the present invention, with reference to FIG. 7

A CPU (Central Processing Unit) 51, constituted by a Pentium (trademark) processor of Intel Corporation for example, is connected to a host bus 52. The host bus 52 is also connected to a bridge 53 (a so-called north bridge) having an AGP (Accelerated Graphics Port) 50. The bridge 53 is connected to a PCI (Peripheral Component Interconnect/Interface) bus 56.

The bridge 53, constituted by the 440BX, which is an AGP host bridge controller made by Intel Corporation, controls the CPU 51 and a RAM (Random Access Memory) 54 (a so-called main memory) for example. In addition, the bridge 53 controls a video controller 57 via the AGP 50. It should be noted that this bridge 53 and a bridge (a so-called south bridge (PCI-ISA bridge) 58 together constitute a so-called chip set.

The bridge 53 is also connected to a cache memory 55. As compared with the RAM 54 constituted by an SRAM (Static RAM), the cache memory 55 is constituted by a memory chip that allows faster read and write operations. The cache memory 55 caches (namely, temporarily stores) a program or data which are used by the CPU 51.

It should be noted that the CPU 51 incorporates a primary cache memory (which operates faster than the cache memory 55 and is controlled by the CPU 51 itself).

The RAM 54 is constituted by a DRAM (Dynamic RAM) for example and stores programs to be executed by the CPU 51 or data necessary for the operation of the CPU 51. To be more specific, upon the completion of a start-up sequence of this personal computer, an electronic mail program 54A, an auto pilot program 54B, a jog dial monitor program 54C, a jog dial driver 54D, an operating system (OS) 54E, and application programs 54F1 through 54Fn including a content manager program (or a part hereof) to be described later are loaded from a HDD 67 into the RAM 54.

The electronic mail program 54A transfers communication messages (or so-called e-mail) through a modem 75 and a communications line such as a telephone line 76. The electronic mail program 54A has an incoming mail acquisition capability. This capability checks a mail server 78 of an Internet service provider 77 if the mail addressed to the user is in a mail box 79. If the mail addressed to the user is found in the mail box, this capability executes processing for acquiring the mail.

The auto pilot program 54B starts and processes plural preset processing operations (or programs) in a preset sequence.

The jog dial monitor program 54C receives the information about jog dial compatibility from each of the above-mentioned application programs and, if the compatibility is confirmed, displays on the LCD 7 what can be done by operating the jog dial 4.

The jog dial monitor program 54C detects an event (rotation or push) made on the jog dial 4 and executes an operation corresponding to the detected event. The jog dial monitor program 54C has a list for receiving information from application programs. The jog dial driver 54D executes various functions in accordance with the operations done on the jog dial 4.

The OS (Operating System) 54E, represented by Windows 95 (trademark) or Windows 98 (trademark) of Microsoft Corporation or Mac OS (trademark) of Apple Computer Inc., controls the basic operations of this personal computer.

The video controller 57, connected to the bridge 53 via the AGP 50, receives data (image data or text data) supplied from the CPU 51 via the AGP 50 and the bridge 53 and generates image data corresponding to the received data or directly stores the received data into an incorporated image memory, not shown. The video controller 57 displays, on the LCD 7 of the display section 3, images corresponding to the image data stored in the video memory.

The PCI bus 56 is connected to a sound controller 64. The sound controller 64 captures a signal corresponding to music supplied from the microphone 9 and generates data corresponding to the music, outputting the generated data to the RAM 54. Or the sound controller 64 drives a speaker 65 on the basis of the data corresponding to the music supplied via the PCI bus 56 or supplied from a memory card driver 151-1 or 151-2, thereby sounding the music from the speaker 65.

The PCI bus 56 is also connected to the modem 75. The modem 75 transmits predetermined data to an network 80 such as the Internet or the mail server 78 via the public telephone line 76 and the Internet service provider 77 and receives predetermined data from the network 80 or the mail server 78.

A PC card slot interface 111, connected to the PCI bus 56, supplies data supplied from the interface card 112 loaded in the slot 14 to the CPU 51 or the RAM 54 and, at the same time, outputs data supplied from the CPU 51 to the interface card 112. A drive 113 is connected to the PCI bus 56 via the PC card slot interface 111 and the interface card 112.

The drive 113 reads data from a magnetic disc 121, an optical disc 122, a magneto-optical disc 123, or a semiconductor memory 124 and supplies the read data to the RAM 54 via the PC card slot interface 111, the interface card 112, and the PCI bus 56.

The PCI bus 56 is also connected to a bridge 58 (a so-called south bridge). The bridge 58, constituted by the PIIX4E made by Intel Corporation for example, incorporates an IDE (Integrated Drive Electronics) controller/configuration register 59, a timer circuit 60, an IDE interface 61, and a USB (Universal Serial Bus) interface 68. The bridge 58 controls various I/O devices such as devices connected to an IDE bus 62 or devices connected via an ISA/EIO (Industry Standard Architecture/Extended Input Output) bus 63 or an I/O interface 69.

The IDE controller/configuration register 59 is constituted by a so-called primary and secondary IDE controllers and a configuration register, both not shown.

The primary IDE controller is connected to the HDD 67 via the IDE bus 62. The secondary IDE controller is electrically connected to an IDE device such as a CD-ROM or an HDD when it is loaded.

As described, the HDD 67 stores the electronic mail program 67A, the auto pilot program 67B, the jog dial monitor program 67C, the jog dial driver 67D, and OS 67E, and the application programs 67F1 through 67Fn. In the process of bootup, these programs are sequentially loaded into the RAM 54. The HDD 67 also stores music data content in its content database.

The USB interface 68 outputs (for example, checks out) coded music data to a connected portable device, not shown, via a USB port 107. The USB interface 68 also outputs music data supplied from the memory card driver 151-1 or 151-2 to the HDD 67 and, at the same time, outputs music data supplied from the HDD to one of the memory card driver 151-1 or 151-2.

The timer circuit 60 supplies current time data to the CPU 51 via the PCI bus 56.

The ISA/EIO bus 63 is also connected to the I/O interface 69. The I/O interface 69 is constituted by an embedded controller in which a ROM 70, a RAM 71, and a CPU 72 are interconnected.

The ROM 70 stores beforehand a LED control program 70A, a pointing device input monitor program 70B, a key input monitor program 70C, a wake-up program 70D, and a jog dial monitor program 70E.

The LED control program 70A controls on/off of the power light PL, the battery light BL, and other LED lights. The pointing device input monitor program 70B monitors the input from the stick-type pointing device 6 corresponding to a user's operation.

The key input monitor program 70C monitors the inputs from the keyboard 5 and other key switches. The wake-up program 70D checks whether a preset time has been reached on the basis of the data indicative of current time supplied from the timer circuit 60 of the bridge 58. When the preset time is found reached, the wake-up program 70D controls the powers to the chips constituting the personal computer 1 in order to start predetermined processing (or a predetermined program). The jog dial monitor program 70E always monitors whether a rotary encoder of the jog dial 4 has been rotated or the jog dial 4 itself has been pressed.

The ROM 70 also stores a BIOS (Basic Input/Output System) 70F. The BIOS 70F controls data transfer (input/output) between the OS or an application program and peripheral devices (the stick-type pointing device 6, the keyboard 5, the HDD 67, and so on).

The RAM 71 has registers 71A through 71F for holding LED control, stick-type pointing device input status, key input status, setting time, and jog dial monitoring input/output (I/O). For example, the LED control register holds a predetermined value when the jog dial 4 is pressed to start the electronic mail program 54A. In correspondence with the stored value, the lighting of a predetermined LED light is controlled. The key input status register, upon pressing of the jog dial 4, stores a predetermined operation key flag. The setting time register holds a predetermined time in accordance with the operation of the keyboard for example by the user.

The I/O interface 69 is connected to the jog dial 4, the keyboard 5, and the stick-type pointing device 6 and outputs signals corresponding to the operations of these controls to the ISA/EIO bus 63. The I/O interface 69 is also connected to the power light PL, the battery light BL, a power controller 73, and other LED lights.

The power controller 73, connected to an incorporated battery 74 or an AC power supply, supplies powers to the components of this personal computer and, at the same time, controls the charging of the incorporated battery 74 and the secondary batteries of peripheral devices. The power controller 73 supplies powers to the memory card drivers 151-1 and 151-2 and the sound controller 64 even if the power to the personal computer 1 is off.

The I/O interface 69 also monitors the power switch 8 which is operated to turn on/off the power to the personal computer 1.

The I/O interface 69 executes the LED monitor program 70A, the pointing device input monitor program 70B, the key input monitor program 70C, the wake-up program 70D, and the jog dial monitor program 70E on the internal power supply even if the power to the personal computer 1 is off. Namely, these programs are always operating.

Consequently, if the power switch is turned off and therefore the CPU 51 is not executing the OS 54E, the I/O interface 69 executes the jog dial monitor program 70E, so that pressing the jog dial 4 in the power saving state or when the power to the personal computer 1 is off makes the same start the processing of a preset predetermined software program or script file.

Thus, in the personal computer 1, the jog dial 4 has programmable power key (PPK) functionality, thereby eliminating the necessity for disposing a dedicated programmable power key.

The memory card driver 151-1 is connected to the bridge 58 by a USB cable. On the basis of commands issued by the CPU 51 and supplied via the bridge 58, the memory card driver 151-1 cross-authenticates the memory card 21-1 loaded in the personal computer 1. Under the control of the CPU 51, the memory card driver 151-1 stores the music data supplied from the HDD 67, which is an internal storage means, into the authenticated memory card 21-1, which is an external storage medium, via the bridge 58.

Under the control of the CPU 51, the memory card driver 151-1 deletes the music data from the memory card 21-1 authenticated.

Under the control of the CPU 51 or in accordance with a signal inputted from the jog lever 12-1, the memory card driver 151-1 reads the music data from the loaded memory card 21-1, decodes the read music data, and supplies the decoded music data to the sound controller 64.

Because the power is kept supplied from the power controller 73 to the memory card driver 151-1 and the sound controller 64 independently via the USB interface 68 when the power to the personal computer 1 is off, the memory card driver 151-1 reads the music data from the loaded memory card 21-1 on the basis of the signal inputted from the jog lever 12-1, decodes the read music data, and sounds the decoded music data.

When the power to the personal computer 1 is on, a music decoding program stored in the HDD 67 may be executed by the CPU 51 to realize decoding of the music data read from the memory card 21-1. In this case, the memory card driver 151-1 supplies the music data read from the memory card 21-1 to the bridge 58 via the USB cable. The music data supplied to the bridge 58 are then supplied to the CPU 51 via the PCI bus 56, the bridge 53, and the host bus 52. The music data are then decoded by the music decode processing program executed by the CPU 51. The decoded music data are supplied to the sound controller 64 via the host bus 52, the bridge 53, and the PCI bus 56, being sounded from the speaker 65.

It should be noted that, for the convenience of description, the signal line between the USB interface 68 and the memory card drivers 151-1 and 151-2 and the power line between the power controller 73 and the memory card drivers 151-1 and 151-2 are shown separately; actually, however, these lines are harnessed into one USB cable.

The memory card driver 151-1 controls the LCD 13-1 so as to display states in which the memory card driver 151-1 stores music data into the memory card 21-1, reads music data therefrom, decodes the read music data, and supplies the decoded music data to the sound controller 64.

The memory card driver 151-2 is connected to the bridge 58 via the USB cable. On the basis of commands supplied from the CPU 51, the memory card driver 151-2 cross-authenticates the memory card 21-2 loaded in the personal computer 1 via the bridge 58. Under the control of the CPU 51, the memory card driver 151-2 stores music data supplied from the HDD 67, which is the internal storage means, into the authenticated memory card 21-2, which is the external storage medium, via the bridge 58.

Under the control of the CPU 51, the memory card driver 151-2 deletes the music data from the memory card 21-2 authenticated.

Under the control of the CPU 51 or on the basis of a signal inputted from the jog lever 12-2, the memory card driver 151-2 reads music data from the memory card 21-2, decodes the read music data, and supplies the decoded music data to the sound controller 64.

Because the power is kept supplied from the power controller 73 to the memory card driver 151-2 and the sound controller 64 via the USB interface 68 when the power to the personal computer 1 is off, the memory card driver 151-2 reads the music data from the loaded memory card 21-2 on the basis of the signal inputted from the jog lever 12-1, decodes the read music data, and sounds the decoded music data.

When the power to the personal computer 1 is on, a music decoding program stored in the HDD 67 may be executed by the CPU 51 to realize decoding of the music data read from the memory card 21-2. In this case, the memory card driver 151-2 supplies the music data read from the memory card 21-2 to the bridge 58 via the USB cable. The music data supplied to the bridge 58 are then supplied to the CPU 51 via the PCI bus 56, the bridge 53, and the host bus 52. The music data are then decoded by the music decode processing program executed by the CPU 51. The decoded music data are supplied to the sound controller 64 via the host bus 52, the bridge 53, and the PCI bus 56, being sounded from the speaker 65.

The memory card driver 151-2 controls the LCD 13-2 so as to display states in which the memory card driver 151-2 stores music data into the memory card 21-2, reads music data therefrom, decodes the read music data, and supplies the decoded music data to the sound controller 64.

Hereafter, the memory cards 21-1 and 21-2 are generically referred to as a memory card 21 unless especially noted. Also, hereafter, the memory card drivers 151-1 and 151-2 are generically referred to as a memory card driver 151 unless especially noted.

Figure 8:
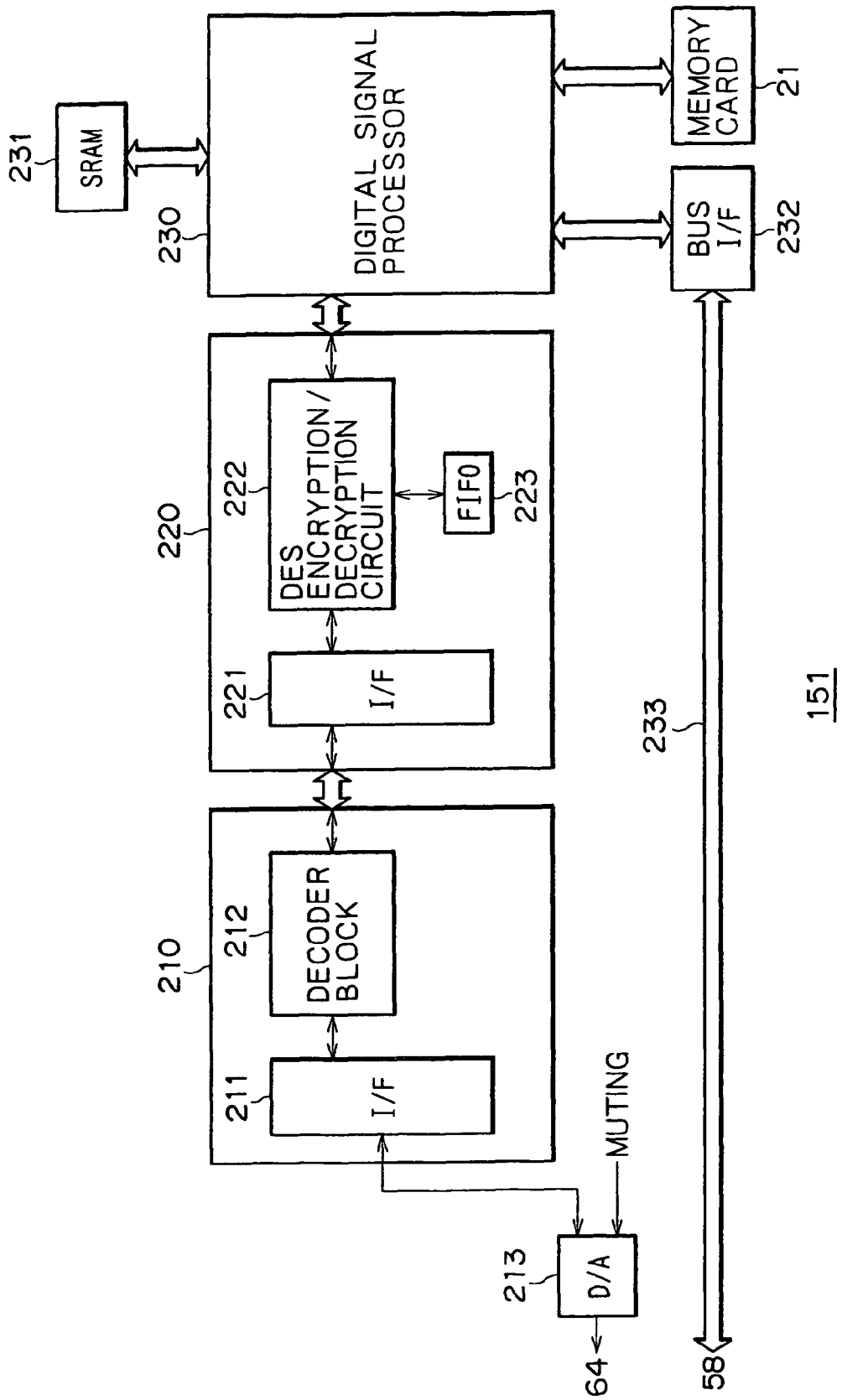
FIG. 8 is a block diagram illustrating a configuration of a memory card driver 151.

Referring to FIG. 8, there is shown a configuration of the memory card driver 151.

The memory card driver 151 has an audio decoder IC 210, a security IC 220, and a DSP (Digital Signal Processor) 230, each being constituted by one IC chip. It should be noted that the DSP 230 may be superseded by a microcomputer.

The audio decoder IC 210 has an audio interface 211 and a decoder block 212. The decoder block 212 decodes the music data (coded) read from the memory card 21. For a highly efficient coding technique for coding music data, ATRAC3, an improvement from ATRAC (Adaptive Transform Acoustic Coding) (trademark) employed for MiniDisc (trademark) is available.

ATRAC3 processes music data in which one sample obtained by sampling by 44.1 KHz consists of 16 bits. The minimal data unit in which music data are processed by ATRAC3 is sound unit SU. One SU is equivalent to 1024 samples (1024×16 bits×2 channels) compressed into several hundred bytes, about 23 ms in time. The music data are compressed by ATRAC3 to about 1/10 of the original data size. As with MiniDisc, the well contrived signal processing of ATRAC3 prevents the tone quality of compressed and decompressed music data from being deteriorated.

The encrypted music data read from the memory card 21 by the DSP 230 are supplied to a DES (Data Encryption Standard) encryption/decryption circuit 222 of the security IC 220. The encryption/decryption circuit 222 decrypts the encrypted music data (into plaintext data) and outputs the decrypted music data to the decoder block 212 of the audio decoder IC 210. The DES encryption/decryption circuit 222 has a FIFO 223. The DES encryption/decryption circuit 222 is provided to protect content copyright.

The memory card 21 has an incorporated DES encryption circuit. The DES encryption/decryption circuit 222 of the memory card driver 151 has plural master keys and a device-unique storage key. Moreover, the DES encryption/decryption circuit 222 has a random number generator to cross-authenticate the memory card 21 having the DES encryption circuit and share a session key with this memory card.

A bus interface 232 is connected to the DSP 230 and data from the bridge 58 are supplied to the DSP 230 via a bus 233. The DSP 230 communicates with the memory card 21 loaded in a detachable mechanism, not shown, via the memory interface to write the encrypted data supplied via the bus 233 to the memory card 21. Between the DSP 230 and the memory card 21, serial communication is performed. In order to allocate a memory size necessary for memory card control, an external SRAM (Static RAM) 231 is connected to the DSP 230.

The bridge 58 supplies data such as a command for music reproduction generated in accordance with a user operation from the keyboard 5 for example to the DSP 230 via the bus interface 232. Additional information such as image information and character information are also supplied to the DSP 230 via the bus interface 232. The bus 233 provides a bidirectional communications path, over which the additional information data and controls signals read from the memory card 21 are captured by an external controller via the bus interface 232. Further, the DSP 230 controls the display operation of the LCD 13 for displaying the operation state of the memory card driver 151. It should be noted that the data transferred over the bus 233 are already encrypted.

Thus, the encrypted music data read from the memory card 21 by the DSP 230 are decrypted by the security IC 220 and the decrypted data are decoded by the audio decoder IC 210 on the basis of ATRAC3. The output of the audio decoder IC 210 is supplied to a D/A (Digital to Analog) converter 213 to be converted into an analog audio signal.

As described, the music data read from the memory card 21 are reproduced and supplied to the sound controller 64 as an analog audio signal corresponding to the music data.

A muting signal is supplied to the D/A converter 213 from the sound controller 64 for example. When the supplied muting signal indicates "on" of muting, the audio output is disabled.

It should be noted that the memory card driver 151 may alternatively supply digital music data to the sound controller 64.

Figure 9:
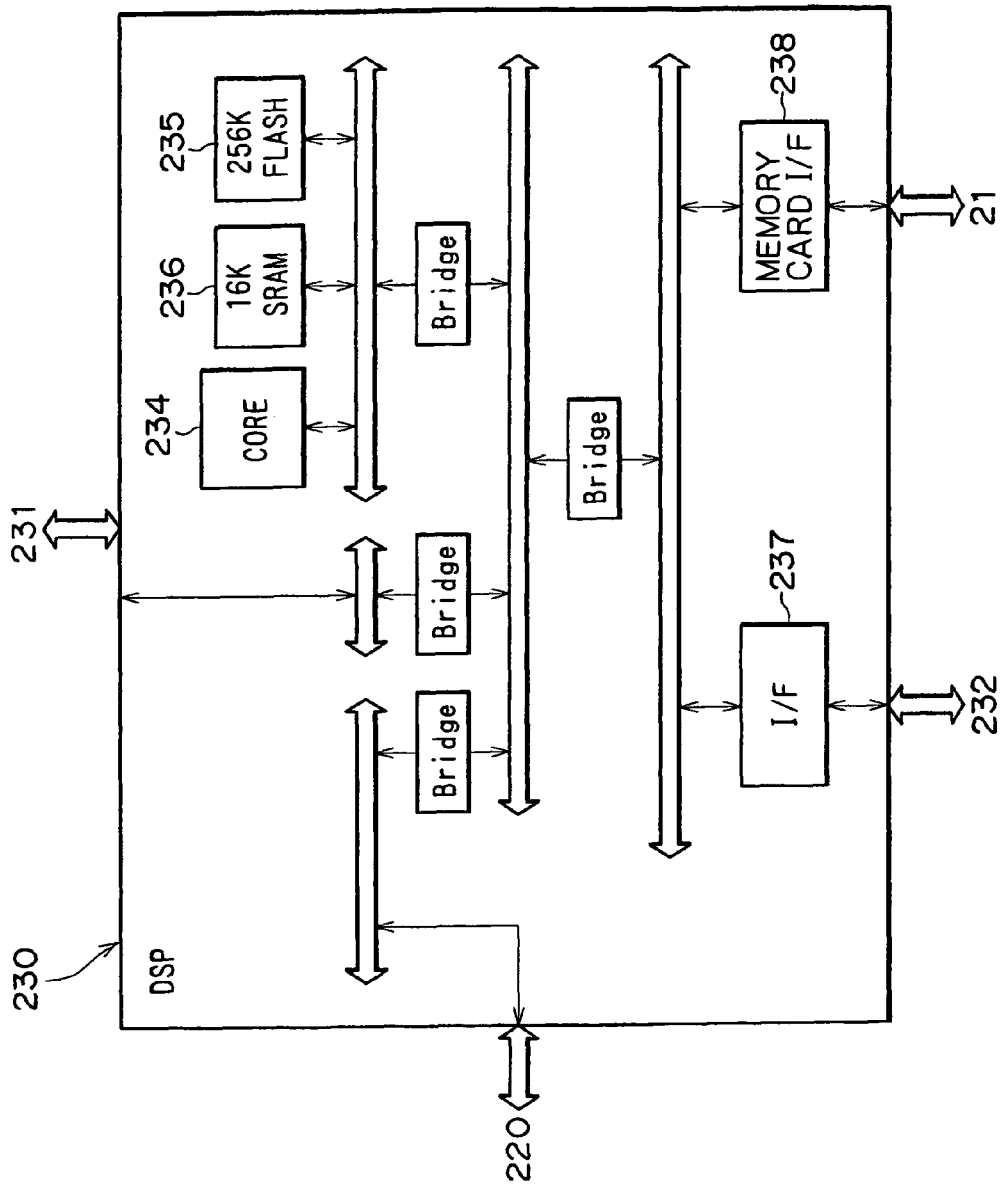
FIG. 9 is a block diagram illustrating a configuration of a DSP 230.

Referring to FIG. 9, there is shown an internal configuration of the DSP 230. The DSP 230 is composed of a core 234, a flash memory 235, an SRAM 236, a bus interface 237, a memory card interface 238, buses and bridges between them. The DSP 230 functions like a microcomputer, the core 234 being equivalent to the CPU of the microcomputer. The flash memory 235 stores programs necessary for the processing by the DSP 230. The SRAM 236 and the external SRAM 231 serve as the RAM for the DSP.

In response to an operation signal such as a command for recording received via the bus interfaces 232 and 237, the DSP 230 executes control of the processing for writing predetermined encrypted music data and predetermined additional information data to the memory card 21 and reading these data from the memory card 21. Namely, the DSP 230 is located between the application software for executing recording and reproducing music data and additional information and the memory card 21, and operates as instructed by software for accessing the memory card 21 and software such as a file system.

For the file management in the memory card 21 by the DSP 230, a FAT file system used in existing personal computers is used. In addition to this file system, a management file having a predetermined data configuration is used. The management file manages the data files recorded on the memory card 21. A management file as first file management information manages files of music data. The FAT file system as second file management information manages all files stored in the flash memory of the memory card 21, including music data files and management file. The management file is recorded on the memory card 21. The FAT is written to the flash memory at factory along with a route directory and so on.

It should be noted that, in order to protect copyright, the present embodiment of the invention encrypts music data compressed by ATRAC3. On the other hand, the present embodiment does not encrypt the management file because copyright protection is unnecessary for it. Some memory cards have an encryption capability while others do not. Only memory cards having an encryption capability can be used by the memory card driver 151 for recording copyrighted music data as with the present embodiment.

Figure 10:
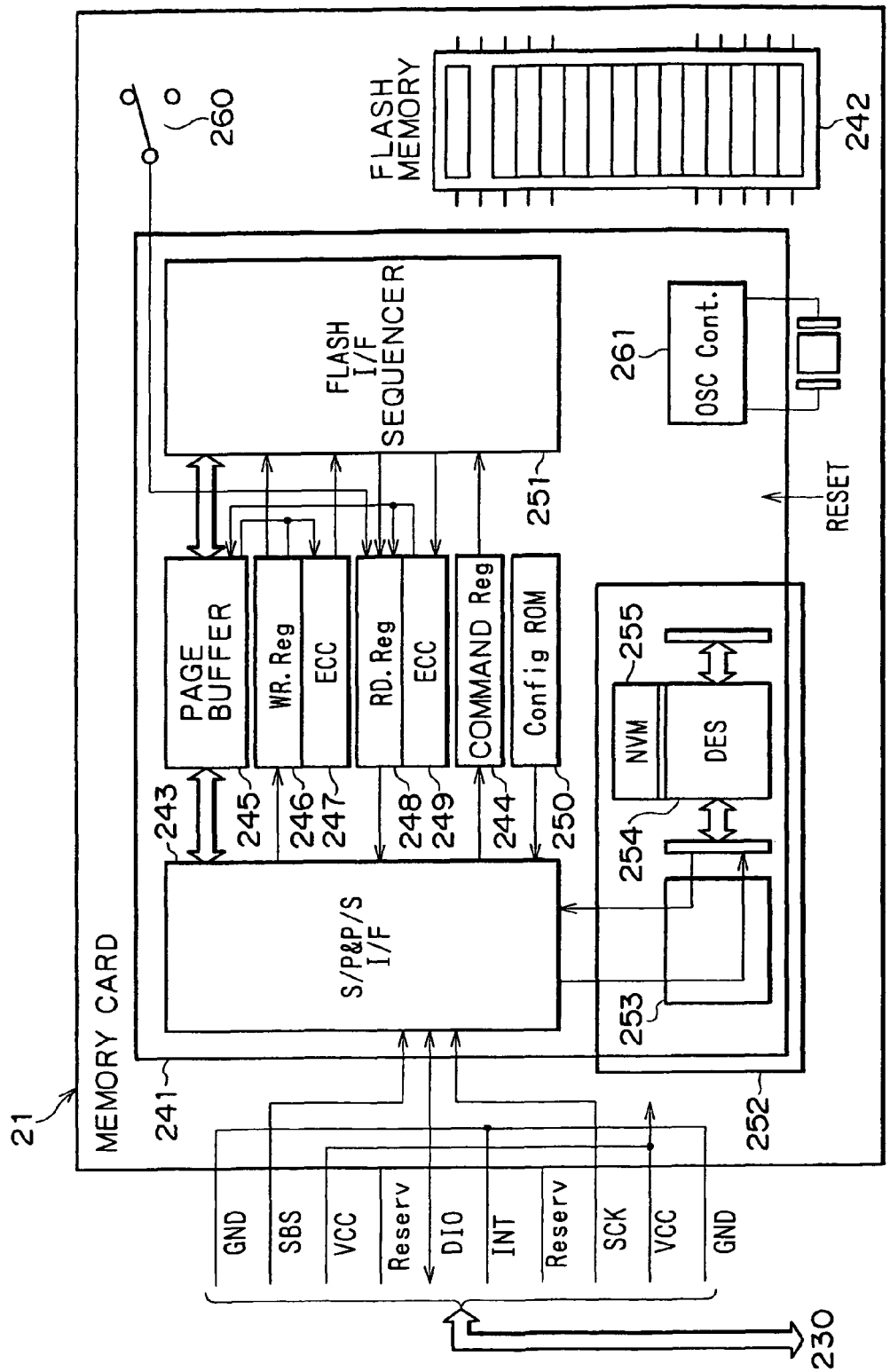
FIG. 10 is a block diagram illustrating a configuration of a memory card 21.

Referring to FIG. 10, there is shown a configuration of the memory card 21. The memory card 21 is composed of a flash memory (nonvolatile memory) 242, a memory control block 241, and a security block 252 including a DES encryption circuit, which are integrally formed on one chip.

A bidirectional serial interface between the DSP 230 of the memory card driver 151 and the DSP 230 consists of 10 lines. The main lines are clock line SCK for transmitting a clock signal at data transmission, status line SBS for transmitting status, data line DIO for transmitting data, and interrupt line INT. In addition, two GND lines and two VCC lines are arranged. Two reserved lines are undefined.

The clock line SCK transmits a clock signal synchronized with data. The status line SBS transmits a signal indicative of the status of the memory card 21. The data line DIO inputs and outputs commands and encrypted music data. The interrupt line INT transmits an interrupt signal for requesting an interrupt from the memory card 21 to the DSP 230 of the memory card driver 151. An interrupt signal is generated when the memory card is loaded in the personal computer. In the present embodiment, the interrupt line INT is grounded because the interrupt signal is transmitted over the data line DIO.

A serial-to-parallel conversion parallel-to-serial conversion interface block (S/P P/S IF block) 243 of the memory control block 241 provides interface between the DSP 230 of the memory card driver 151 and the memory control block 241 connected with the above-mentioned lines. The S/P P/S IF block 243 converts serial data received from the DSP 230 of the memory card driver 151 into parallel data to capture them into the memory control block 241 and converts parallel data received from the memory control block 241 into serial data to send them to the DSP 230 of the memory card driver 151. In addition, when the S/P P/S IF block 243 receives commands and data transmitted over the data line DIO, the block 243 separates a command and data for normal access to the flash memory 242 from those necessary for encryption.

Namely, in the transmission over the data line DIO, a command is transmitted first, followed by data. The S/P P/S IF block 243 checks the code of the received command to determine whether that command and the following data are necessary for normal access or encryption. In accordance with the decision, the block 243 stores the command for normal access into a command register 244 and the data into a page buffer 245 and a write register 246. An error correction code circuit 247 is arranged in association with the write register 246. The error correction code circuit 247 generates a redundancy code for error correction to be executed on the data temporarily stored in the page buffer 245.

The data outputted from the command register 244, the page buffer 245, the write register 246, and the error correction code circuit 247 are supplied to a flash memory interface and sequencer (a memory I/F sequencer) 251. The memory I/F sequencer 251 provides interface between the memory control block 241 and the flash memory 242, controlling the data transfer between them. The data are written to the flash memory 242 through the memory IF sequencer.

Content (music data compressed by ATRAC3, hereafter referred to as ATRAC3 data) to be written to the flash memory 242 is already encrypted by the personal computer 1 or the security block 252 of the memory card 21 for copyright protection.

The security block 252 has a buffer memory 253, a DES encryption circuit 254, and a nonvolatile memory 255.

The security block 252 of the memory card 21 has plural authentication keys and a storage key which is unique to each memory card. The nonvolatile memory 255 stores the keys necessary for encryption and therefore is not visible from the outside. For example, the storage key is stored in the nonvolatile memory 255. Further the security block 252 has a random number generator for cross-authentication with the dedicated memory card driver 151 for session key sharing (the dedicated memory card driver means one used in a system in which a certain data format for example is used commonly). Moreover, the security block 252 can redo encryption by the storage key through the DES encryption circuit 254.

For example, authentication is executed upon loading of the memory card 21 into the memory card driver, the security IC 220 of the memory card driver 151 and the security block 252 of the memory card 21. When the memory card driver 151 verifies the identity of the loaded memory card 21 (verifies that this memory card is one used in the same system in which the memory card driver is also used) and the memory card 21 verifies the identity of the memory card driver 151 (verifies that this memory card driver is one used in the same system in which the memory card is also used), cross-authentication is established. When cross-authentication has been established, the memory card driver 151 and the memory card 21 each generates a session key to share the generated session key. The session key is generated every time cross-authentication is established.

When content is written to the memory card 21, the memory card driver 151 encrypts the content by the session key and passes the encrypted content to the memory card 21. The memory card 21 decrypts the encrypted content by the session key, encrypts the decrypted content key by the storage key, and passes the encrypted content key to the memory card driver 151. The storage key is unique to each memory card 21. The memory card driver 151 writes the encrypted content key and the encrypted content to the memory card 21.

The data read from the flash memory 242 are supplied to the page buffer 245, a read register 248, and an error correction circuit 249 via the memory IF sequencer 251. The data stored in the page buffer 245 are error-corrected by the error correction circuit 249. The error-corrected output of the page buffer 245 and the output of the read register 248 are supplied to the S/P P/S IF block 243 to be sent to the DSP 230 of the memory card driver 151 via the above-mentioned serial interface.

At reading, the content key encrypted by the storage key and the content encrypted by a block key are read from the flash memory 242. The content key is decrypted by the security block 252 with the storage key. The decrypted content key is encrypted by the session key and the encrypted content key is sent to the memory card driver 151. The memory card driver 151 decrypts the content key by the received session key. The memory card driver 151 generates a block key by the decrypted content key. This block key is used to sequentially decrypt the encrypted ATRAC3 data.

Reference numeral 250 denotes a configuration ROM in which the version number and other various attribute information of the memory card 21 are stored. The memory card 21 has a switch 260 operable by the user for preventing data from being deleted by mistake. When the switch 260 is set to the deletion protected side, the data stored in the flash memory 242 is protected from deletion instructed by a delete command issued from the memory card driver 151. Reference numeral 261 denotes an oscillator for generating a clock signal that provides timing reference for the processing of the memory card 21.

Figure 11:
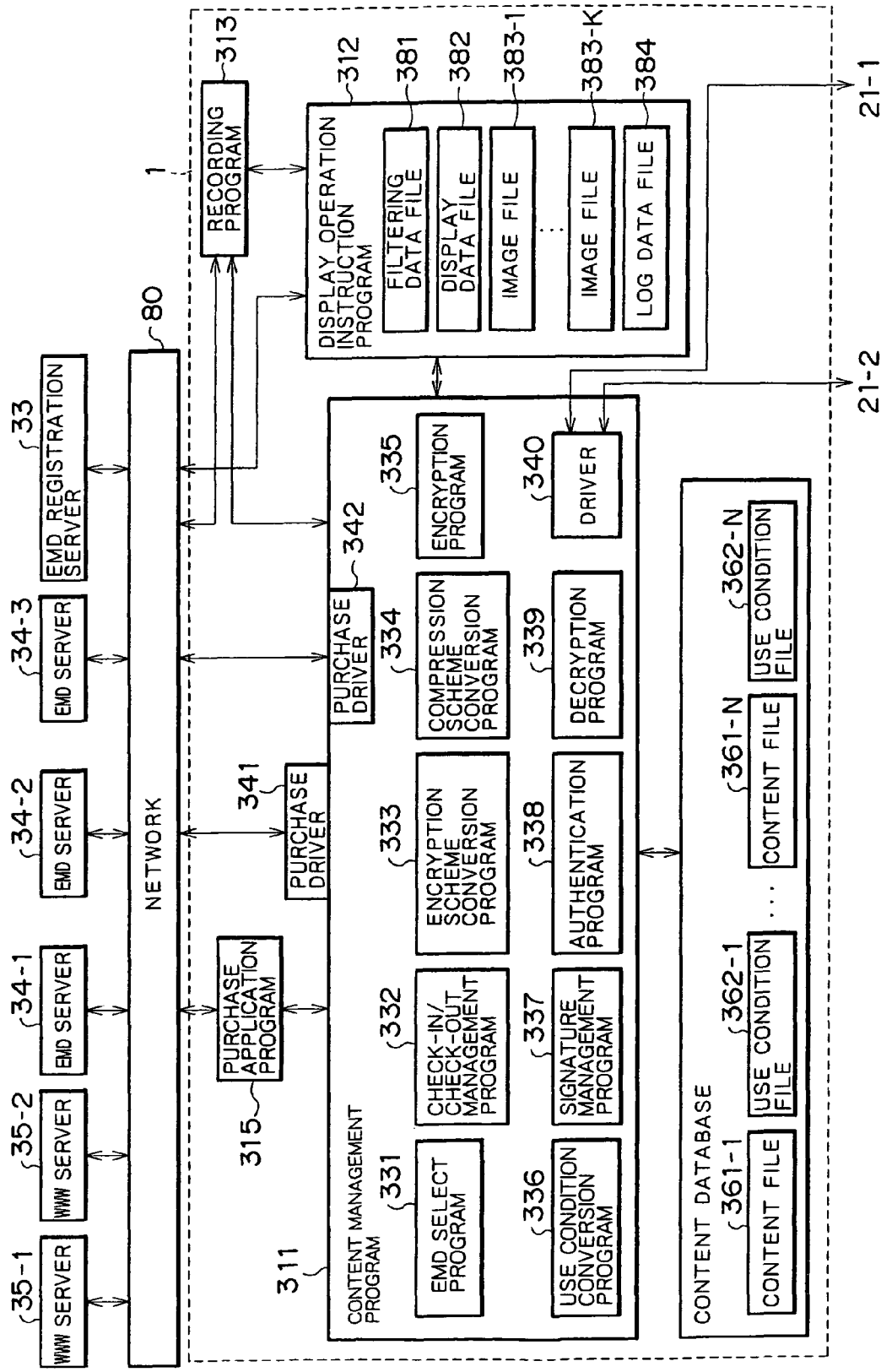
FIG. 11 is a block diagram illustrating a functional configuration of the personal computer 1.

Referring to FIG. 11, there is shown a block diagram illustrating a functional configuration of the personal computer 1 to be realized by the execution of predetermined programs by the CPU 51. The personal computer 1 converts music data received from any of EMD (Electrical Music Distribution) servers 34-1 through 34-3 or music data read from a CD (Compact Disc) loaded in the drive 113 into a predetermined compressed form (for example, ATRAC3), encrypts the converted music data by DES (Data Encryption Standard), and records the encrypted music data.

In correspondence to the recorded encrypted content, the personal computer 1 records use condition data indicative of the conditions for using the content. The use condition data indicate, for example, that the corresponding content may be used by three portable devices (PDs) or memory cards 21 at a time, may be copied (if the content is stored in a portable device or the memory card 21, the content stored in the personal computer 1 may be used; the number of times content can be recorded to a portable device or the memory card 21 may be limited, in the case of which the number of times does not increase), or may be moved to the memory card 21 (in this case, the content stored in the personal computer 1 is no more usable after the movement).

When the recorded encrypted content has been moved along with its additional information data to the loaded memory card 21-1, the personal computer 1 updates the corresponding use condition data (to disable the reproduction of the moved content on the side of the personal computer). Also, when the recorded encrypted content has been moved along with its additional information data to the loaded memory card 21-2, the personal computer 1 updates the corresponding use condition data.

When the recorded encrypted content has been copied along with its additional information data to the loaded memory card 21-1, the personal computer 1 updates the corresponding use condition data. Also, when the recorded encrypted content has been copied along with its additional information data to the loaded memory card 21-2, the personal computer 1 updates the corresponding use condition data.

The personal computer 1 stores the recorded encrypted content to the loaded memory card 21-1 along with the corresponding additional information data and, when this storage has been completed, the personal computer 1 updates the corresponding use condition data (this update operation is hereafter referred to as a check-out). To be more specific, when a check-out is made, the number of times the corresponding use condition data can be checked out is decremented by one. When the checkout count is 0, the corresponding content cannot be checked out.

The personal computer 1 stores the recorded encrypted content to the loaded memory card 21-2 along with the corresponding additional information data and, when this storage has been completed, the personal computer 1 updates the corresponding use condition data.

Further, the personal computer 1 makes the loaded memory card 21-1 delete (or disable the use of) the content checked out by the personal computer 1 and updates the corresponding use condition data (this update operation is hereafter referred to as a check-in). To be more specific, when a check-in is made, the number of times the corresponding user condition data recorded in the personal computer 1 can be checked out is incremented by one.

The personal computer 1 makes the loaded memory card 21-2 delete (or disable the use of) the content checked out by the personal computer 1 and updates the corresponding use condition data.

The personal computer 1 cannot check in the content which was checked out in the memory card 21-1 by another personal computer, not shown. The personal computer 1 cannot check in the content which was checked out in the memory card 21-2 by another personal computer, not shown.

When the personal computer 1 starts getting content from any of the EMD servers 34-1 through 34-3, an EMD registration server 33, in response to a request by the personal computer 1, sends an authentication key necessary for cross authentication between the personal computer 1 and any of the EMD servers 34-1 through 34-3 to the personal computer 1 and sends a program for establishing a connection with any of these servers to the personal computer 1.

In response to a request from the personal computer 1, the EMD server 34-1 supplies the content and its additional information data (for example, music title and reproduction condition) to the personal computer 1 via the network 80. In response to a request from the personal computer 1, the EMD server 34-2 supplies the content and its additional information data to the personal computer 1 via the network 80. In response to a request from the personal computer 1, the EMD server 34-3 supplies the contents and its additional information data to the personal computer 1 through the network 80.

The content supplied by each of the EMD servers 34-1 through 34-3 is compressed in the same or different compression schemes. The content supplied by each of the EMD servers 34-1 through 34-3 is encrypted by the same or different encryption schemes.

In response to a request from the personal computer 1, a WWW (World Wide Web) server 35-1 supplies data corresponding to a CD from which content was read (for example, album name or distributor name of the CD) and data corresponding to the content read from the CD (for example, music title and composer name) to the personal computer 1 via the network 80. In response to a request from the personal computer 1, a WWW server 35-2 supplies data corresponding to a CD from which content was read and data corresponding to the content read from the CD to the personal computer 1 via the network 80.

A content management program 311 consists of an EMD select program 331, a check-in/check-out management program 332, an encryption scheme conversion program 333, a compression scheme conversion program 334, an encryption program 335, a use condition conversion program 336, a signature management program 337, an authentication program 338, a decryption program 339, a driver 340, a purchase driver 341, and a purchase driver 342.

The content management program 311 is described by shuffled or encrypted instructions and configured so that the contents of its processing are hidden from the outside to make their interpretation difficult (for example, if the user directly reads the content management program 311, no instructions can be identified).

When the content management program 311 is installed in the personal computer 1, the EMD select program 331 is not included in the content management program 311 but is received from the EMD registration server 33 via the network 80 in EMD registration. The EMD select program 331 selects a connection to any of the EMD servers 34-1 through 34-3 to make the selected EMD server communicate with one of a purchase application program 315 or the purchase driver 341 or 342 (for example, the downloading of content when it is purchased).

The check-in/check-out management program 332 checks out content stored in any of content files 361-1 through 361-N to one of the memory card 21-1 or 21-2 or checks in content stored in the memory card 21-1 or 21-2 on the basis of the setting of check-in or check-out and use condition files 362-1 through 362-N recorded in a content database 314.

In accordance with the check-in or check-out processing, the check-in/check-out management program 332 updates the use condition data stored in the use condition files 362-1 through 362-N.

The encryption scheme conversion program 333 converts an encryption scheme by which content received from the EMD server 34-1 by the purchase application program 315 via the network 80 is encrypted, an encryption scheme by which content received from the EMD server 34-2 by the purchase driver 341 via the network 80 is encrypted, or an encryption scheme by which content received from the EMD server 34-3 by the purchase driver 342 via the network 80 into the same encryption scheme by which content stored in the content files 361-1 through 361-N recorded in the content database 314.

Also, when checking out content to the memory card 21-1 or 21-2, the encryption scheme conversion program 333 converts the encryption scheme by which the content to be checked out is encrypted into an encryption scheme usable by the memory card 21-1 or 21-2.

The compression scheme conversion program 334 converts a compression scheme by which content received by the purchase application program 315 from the EMD server 34-1 via the network 80 is compressed, a compression scheme by which content received by the purchase driver 341 from the EMD server 34-2 via the network 80 is compressed, or a compression scheme by which content received by the purchase driver 342 from the EMD server 34-3 via the network 80 is compressed into the same compression scheme of the content stored in the content files 361-1 through 361-N recorded in the content database 314.

The compression scheme conversion program 334 encodes content (not compressed) read from a CD for example and supplied from the recording program 313 by the same coding scheme by which the content stored in the content files 361-1 through 361-N recorded in the content database 314.

When content is checked out to the memory card 21-1 or 21-2, the compression scheme conversion program 334 converts the compression scheme of the content to be checked out into a compression scheme available to the memory card 21-1 or 21-2.

The encryption program 335 encrypts content (not encrypted) read from a CD for example and supplied from the recording program 313 by the same encryption scheme by which the content stored in the content files 361-1 through 361-N recorded in the content database 314 is encrypted. The encryption program 335 executes content key encryption processing.

The use condition conversion program 336 converts the format of data (so-called usage rule) indicative of use condition of content received by the purchase application program 315 from the EMD server 34-1 via the network 80, the format of data indicative of use condition of content received by the purchase driver 341 from the EMD server 34-2 via the network 80, or the format of data indicative of use condition of content received by the purchase driver 342 from the EMD server 34-3 via the network 80 into the same format of the use condition data stored in the use condition files 362-1 through 362-N recorded in the content database 314.

Also, when content is checked out to the memory card 21-1 or 21-2, the use condition conversion program 336 converts the data of use condition for the content to be checked out into the data (included in content additional information data) of use condition data available to the memory card 21-1 or 21-2.

The signature management program 337 detects a tamper in the use condition data stored in the use condition files 362-1 through 362-N recorded in the content database 314 on the basis of the signature included in these use condition data before executing check-in or check-out processing. The signature management program 337 updates the signature included in the use condition data in accordance with the update of the use condition data stored in the use condition files 362-1 through 362-N recorded in the content database 314.

The authentication program 338 executes cross authentication between the content management program 311 and the purchase application program 315 and between the content management program 311 and the purchase driver 341. In addition, the authentication program 338 stores authentication keys used for the cross authentication between the EMD server 34-1 and the purchase application program 315, between the EMD server 34-2 and the purchase driver 341, and between the EMD server 34-3 and the purchase driver 342.

The authentication key for use by the authentication program 338 in cross-authentication processing has not yet been stored in the authentication program 338 when the content management program 311 is installed in the personal computer 1. The authentication key is stored from the EMD registration server 33 into the authentication program 338 when the registration processing has been normally executed by the display operation instruction program 312.

The decryption program 339 decrypts content stored in the content files 361-1 through 361-N recorded in the content database 314 when the personal computer 1 reproduces the content. The decryption program 339 executes content key decryption processing.

The driver 340 supplies content and content additional information data to the memory card driver 151-1 or commands to make the memory card driver execute predetermined processing when moving predetermined content to the memory card 21-1, copying predetermined content onto the memory card 21-1, checking out predetermined content to the memory card 21-1, or checking in predetermined content to the memory card 21-1.

The driver 340 supplies content and content additional information data to the memory card driver 151-2 or commands to make the memory card driver execute predetermined processing when moving predetermined content to the memory card 21-2, copying predetermined content onto the memory card 21-2, checking out predetermined content to the memory card 21-2, or checking in predetermined content to the memory card 21-2.

The purchase driver 341 is a so-called plug-in program, installed in the personal computer 1 along with the content management program 311, and supplied from the EMD registration server 33 via the network 80 or from a predetermined CD. The purchase driver 341, when installed into the personal computer 1, transfers data with the content management program 311 via an interface of predetermined formation of this program.

The purchase driver 341 requests, via the network 80, the EMD server 34-2 for the transmission of predetermined content and receives the requested content. In addition, the purchase driver 341 executes accounting processing when it receives the content from the EMD server 34-2.

The purchase driver 342 is installed along with the content management program 311, requests, via the network 80, the EMD server 34-3 for the transmission of predetermined content, and receives the requested content. In addition, the purchase driver 342 executes accounting processing when it receives the content from the EMD server 34-3.

The display operation instruction program 312 makes the LCD 7 show an image of a predetermined window on the basis of a filtering data file 381, a display data file 382, image files 383-1 through 383-K, or a log data file 384. At the same time, this program instructs the content management program 311 to execute processing operations such as content movement, check-in, and check-out on the basis of an operation made on the keyboard 5 or the stick-type pointing device 6.

The filtering data file 381 stores data for weighting content stored in the content files 361-1 through 361-N recorded in the content database 314. This data file is recorded on the HDD 67.

The display data file 382 stores data corresponding to the content stored in the content files 361-1 through 361-N recorded on the content database 314. This data file is recorded on the HDD 67.

The image files 383-1 through 383-K store images corresponding to the content files 361-1 through 361-N recorded on the content database 314 or images corresponding to a package to be described later. These image files are recorded on the HDD 67.

In what follows, the image files 383-1 through 383-K are generically referred to as an image file 383 unless especially noted.

The log data file 384 stores log data such as check-out count, check-in count, and date check-out or check-in of the content stored in the content files 361-1 through 361-N recorded in the content database 314. This data file is recorded on the HDD 67.

At registration processing, the display operation instruction program 312 sends, via the network 80, the ID of the stored content management program 311 to the EMD registration server 33 and receives the authentication key and the EMD select program 331 from the EMD registration server 33, supplying the received authentication key and EMD select program 331 to the content management program 311.

The recording program 313 displays an image of a predetermined window and, on the basis of an operation made on the keyboard 5 or the stick-type pointing device 6, reads data such as content recording time from a CD, which is the optical disc 122, loaded in the drive 113.

On the basis of the content recording time recorded on the CD, the recording program 313 requests, via the network 80, the WWW server 35-1 or 35-2 for the transmission of data (for example, album name and artist name) corresponding to the CD or data (for example, music title) corresponding to the content recorded on the CD and receives the data corresponding to the CD or corresponding to the content recorded on the CD from the WWW server 35-1 or 35-2.

The recording program 313 supplies the received data corresponding to the CD or corresponding to the content recorded on the CD to the display operation instruction program 312.

When a recording instruction comes, the recording program 313 reads content from the CD, which is the optical disc 122, loaded in the drive 113 and outputs the content to the content management program 311.

The content database 314 stores the content supplied from the content management program 311, which is compressed in a predetermined compression scheme and encrypted in a predetermined encryption scheme, into one of the content files 361-1 through 361-N (recorded on the HDD 67). The content database 314 stores the data of use condition corresponding to the content stored in each of the content files 361-1 through 361-N into one of the use condition files 362-1 through 362-N (recorded on the HDD 67) corresponding to the content files 361-1 through the 361-N.

Music data of about four minutes of play time read from the CD are compressed by the compression scheme conversion program 334 on the basis of ATRAC3 into music data of less than 4 megabytes. Therefore, if it is assumed that 10 pieces of music each being 4 megabytes long be stored on one CD and the size of the HDD 67 allocated to the content database 314 be 40 gigabytes, then the content database 314 can store music data for 10,000 pieces of music, equivalent to 1,000 CDs.

The content database 314 may record the content files 361-1 through 361-N or the use condition files 362-1 through 362-N as records.

For example, the use condition data for content stored in the content file 361-1 are stored in the use condition file 362-1. The use condition data for content stored in the content file 361-N are stored in the use condition file 362-N.

In what follows, the content files 361-1 through 361-N are generically referred to as a content file 361 unless otherwise specified. Also, the use condition files 362-1 through 362-N are generically referred to as a use condition file 362 unless otherwise specified.

The purchase application program 315 is supplied from the EMD registration server 33 via the network 80 or from a predetermined CD. The purchase application program 315 requests the EMD server 34-1 via the network 80 for the transmission of a predetermined piece of content and supplies the received content to the content management program 311. Also, the purchase application program 315 executes accounting processing when it receives the content from the EMD server 34-1.

The following describes the relationship between the data stored in a display data file 82 and the content files 361-1 through 361-N recorded in the content database.

Content stored in one of the content files 361-1 through 361-N belongs to a predetermined package. To be specific, a package is an original package, a my select package, or a filtering package.

The original package contains one or more pieces of content and corresponds to the classification (for example, a so-called album) in the EMD servers 34-1 through 34-3 or corresponds to one CD. Content belongs to one of original packages and cannot belong to two or more original packages. An original package to which content belongs cannot be changed. The user can edit part of information (addition of information or modification of added information) about the original package to which content belongs.

The my select package contains one or more pieces of content selected by the user at will. Which content belongs to the my select package can be edited by the user at will. One piece of content can belong to two or more my select package simultaneously. Also, no content may belong to any my select package.

The filtering package contains content selected on the basis of the filtering data stored in the filtering data file 381. The filtering data are supplied from the EMD servers 34-1 through 34-3 or the WWW servers 35-1 and 35-2 via the network 80 or from a predetermined CD. The user can edit the filtering data stored in the filtering data file 381.

The filtering data provide a reference for selection of predetermined pieces of content or for computing the weights for them. For example, use of the filtering data for week's J-POP (a pops hit chart in Japan) best 10 allows the personal computer 1 to identify the content of number 1 through number 10 of this week's J-POP.

The filtering data file 381 contains filtering data for selecting content in the order of longer check-out periods in the past one month, filtering data for selecting content in the order of higher check-out counts in the past half year, or filtering data for selecting content in which a music title has a word "love" for example.

Thus, the content in the filtering packages is selected by relating the filtering data to content display data (including data set by the user to the content display data) or the log data file 384.

Figure 12:
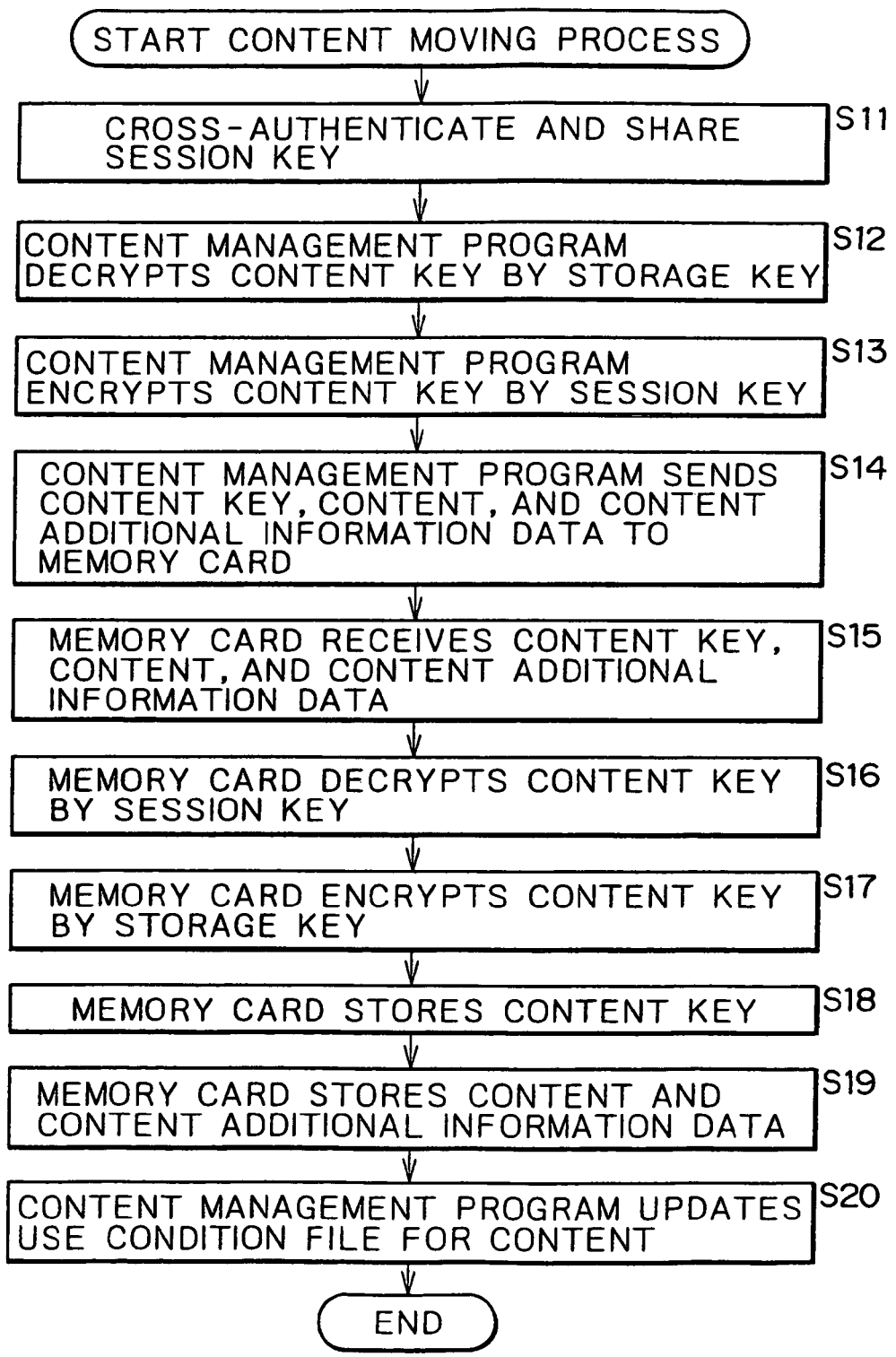
FIG. 12 is a flowchart indicative of content moving.

The following describes the processing for moving content from the personal computer 1 to the memory card 21 with reference to the flowchart shown in FIG. 12. In step S11, the authentication program 338 of the content management program 311 cross-authenticates the security block 252 of the memory card 21 to share a session key.

In step S12, the decryption program of the content management program 311 decrypts, by a storage key stored therein, a content key corresponding to the content to be moved. In step S13, the encryption program 335 of the content management program 311 encrypts the content key by the session key shared by the memory card 21.

In step S14, the driver 340 of the content management program 311 reads the target content (encrypted by the content key) from the content database 314 and makes the memory card 21 transmit the content key encrypted by the session key, the target content, and content additional information data to the DSP 230 of the memory card driver 151.

In step S15, the memory control block 241 of the memory card 21 receives, via the bus interface 232, the content key encrypted by the session key, the target content, and the content additional information data.

In step S16, the security block 252 of the memory card 21 decrypts the content key by the shared session key. In step S17, the security block 252 of the memory card 21 encrypts the content key by storage key stored in the nonvolatile memory 255.

In step S18, the memory control block 241 of the memory card 21 stores the content key into the flash memory 242. In step S19, the memory control block 241 of the memory card 21 stores the target content and the content additional information data into the flash memory 242.

In step S20, the content management program 311 updates the use condition file 362 corresponding to the content database 314 (records that the target content is available no more), upon which the content moving processing comes to an end.

Thus, the personal computer 1 can move user-specified content to the memory card 21.

It should be noted that the personal computer 1 can check out the target content to the memory card 21 by updating the use condition file 362 in correspondence to the checkout in step S20.

The above-mentioned sequence of processing operations may be executed by hardware as well as software. The execution by software is realized by a computer having a dedicated hardware device in which the programs constituting the software are incorporated or by a general-purpose personal computer in which these programs are loaded from a program storage medium.

A program storage medium for storing programs which are loaded into a computer and made executable is constituted by a package medium, which is the magnetic disc 121 (including floppy disc), the optical disc 122 (including CD-ROM (Compact Disc Read Only Memory) and DVD (Digital Versatile Disc)), the magneto-optical disc 123 (including MD (Mini-Disc) or the semiconductor memory 124 or constituted by a ROM in which the programs are stored temporarily or permanently or a hard disc incorporated in the HDD 67. The loading of programs into the program storage medium is executed by use of a wired or wireless communications medium such as a local area network, the network 80, or digital satellite broadcasting via an interface such as a router and the modem 75 as required.

It should be noted that the steps describing the programs to be stored in the program storage medium are not only executed in a time-dependent manner in the order described, but also in parallel or in a discrete manner.

It should be noted that the system herein referred to denotes an entire apparatus composed of two or more components.

As mentioned above and according to the invention, in the general-purpose computer and the copyright management method for use therein, the general-purpose computer cross-authenticates the external storage medium, and upon successful cross-authentication, the general-purpose computer stores copyrighted data from its internal storage means into the external storage medium. Consequently, the novel constitution allows the general-purpose computers to store copyrighted data from their internal storage means directly into external storage media upon successful cross-authentication without use of intermediary external equipment such as portable devices.

While the preferred embodiments of the present invention have been described using specific terms, such description is for illustrative purposes only, and it is to be understood that changes and variations may be made without departing from the spirit or scope of the appended claims.

What is claimed is:

1. A general-purpose computer having a central processing unit configured to decode data stored in an internal storage mechanism as instructed by a program stored in said internal storage mechanism, comprising:
    a loading mechanism, which is integrally arranged on a case of said general-purpose computer, for detachably accommodating an external storage card;
    a decoding mechanism configured to decode data read from said external storage card;
    a reproduction mechanism configured to reproduce decoded data decoded by said decoding mechanism;
    a power controller configured to supply power to said general-purpose computer, wherein said power controller supplies power to said decoding mechanism and said reproduction mechanism even if power of said central processing unit is turned off, and said loading mechanism is configured to read said decoded data based on commands from said central processing unit when said general-purpose computer is in an active state and said loading mechanism is configured to read said decoded data based on commands from an external storage card control mechanism integrally arranged on said case of said general-purpose computer, without control of a central processing unit, when said general-purpose computer is in an inactive state;
    a cross-authentication mechanism configured to cross-authenticate said external storage card through said loading mechanism; and
    a control mechanism configured to supply copyrighted data read from said external storage card to said reproducing mechanism upon successful cross-authentication by said cross-authentication mechanism even if power of said central processing unit is turned off,
    wherein said power controller supplies power to said cross-authentication mechanism and said control mechanism even if power of said central processing unit is turned off and when said external storage card has been cross-authenticated with said general-purpose computer, said external storage card control mechanism plays copyrighted music data stored on said external storage card even if power of said central processing unit is turned off, and said encrypted data is encrypted by a Data Encryption Standard encryption/decryption unit included in said external storage card.

2. The general-purpose computer according to claim 1, wherein in said inactive state in which no electric power is supplied to said central processing unit, said external storage card control mechanism reads copyrighted data from said external storage card and supplies said copyrighted data to a portable music playing device.

3. The general-purpose computer according to claim 2, further comprising:
    a display configured to display an operation of at least one of said external storage card control mechanism and said portable music playing device when said general-purpose computer is in an inactive state in which no electric power is supplied to said central processing unit.

4. The general-purpose computer according to claim 1, wherein a functional equivalent to a portable music playing device is realized by executing, by a controller of said general-purpose computer, a program stored in said internal storage mechanism of said general-purpose computer when power of said central processing unit is turned off.

5. The general-purpose computer according to claim 1, wherein said internal storage mechanism is a hard drive.

6. The general-purpose computer according to claim 1, wherein said copyrighted data is encrypted copyrighted data.

7. The general-purpose computer according to claim 1, wherein when said external storage card control mechanism is operated and said central processing unit is in said inactive state, a predetermined software program is executed.

8. The general-purpose computer according to claim 1, wherein said external storage card control mechanism has programmable power key functionality.

9. The general-purpose computer according to claim 1, wherein said loading mechanism is located on a side of a case enclosing a monitor for said general-purpose computer.

10. The general-purpose computer according to claim 1, wherein said power controller supplies power to said decoding mechanism and reproduction mechanism independently via a USB cable, when said central processing unit is off.

11. The general-purpose computer according to claim 1, wherein a display is located on a top side of a case enclosing a monitor for said general-purpose computer, said display being visible even when said top side of said case is closed.

12. The general-purpose computer according to claim 1, wherein said Data Encryption Standard encryption/decryption unit has a random number generator configured to cross-authenticate said external storage card and share a session key with said external storage card.

13. The general-purpose computer according to claim 1, wherein said Data Encryption Standard encryption/decryption unit has plural master keys and a device unique storage key.

* * * * *